US006558764B2

(12) United States Patent
Blom et al.

(10) Patent No.: US 6,558,764 B2
(45) Date of Patent: *May 6, 2003

(54) SINGLE LAYERED POLYPROPYLENE CONTAINERS AND THEIR USE

(75) Inventors: Bas Blom, Breda (NL); Peter van Eijk, Bergen op Zoom (NL); Bartholomeus J. M. van der Poel, Tholen (NL)

(73) Assignee: General Electric Company, Pittsfield, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 171 days.

(21) Appl. No.: 09/263,446

(22) Filed: Mar. 5, 1999

(65) Prior Publication Data

US 2002/0009562 A1 Jan. 24, 2002

(51) Int. Cl.⁷ .................. B65D 79/00; B65D 81/20
(52) U.S. Cl. .................. 428/36.92; 53/425; 53/428; 53/524.4; 428/36.6
(58) Field of Search .................. 428/36.92, 36.6; 53/425, 428, 524.4

(56) References Cited

U.S. PATENT DOCUMENTS

| 4,517,316 A | 5/1985 | Mason .................. 521/81 |
| RE34,019 E | 8/1992 | Kuklies et al. .................. 383/8 |
| 5,561,967 A | 10/1996 | Nguyen .................. 53/452 |
| 5,563,979 A | 10/1996 | Bruce et al. .................. 385/142 |
| 5,611,626 A | 3/1997 | Warr .................. 383/10 |
| 5,678,849 A | 10/1997 | Davis .................. 280/728.3 |
| 5,709,641 A | 1/1998 | Vaquero .................. 493/243 |
| 5,795,946 A * | 8/1998 | Agarwal et al. .................. 526/348.1 |
| 5,816,027 A | 10/1998 | Li .................. 53/443 |
| 5,839,258 A | 11/1998 | Takayanagi et al. .................. 53/425 |
| 5,863,130 A | 1/1999 | Nguyen .................. 383/9 |
| 5,879,767 A | 3/1999 | Matsushima et al. .................. 428/35.2 |
| 5,884,452 A | 3/1999 | Bois .................. 53/412 |
| 5,916,969 A | 6/1999 | Wang et al. .................. 525/64 |
| 5,919,535 A | 7/1999 | Dobreski et al. .................. 428/35.2 |

FOREIGN PATENT DOCUMENTS

| EP | 420619 A | * | 4/1991 |
| GB | 2 187 438 A | | 9/1987 |

* cited by examiner

Primary Examiner—Sandra M. Nolan

(57) ABSTRACT

The invention relates to packaging for hygroscopic resin materials, and more particularly the invention relates to methods for packaging a hygroscopic resin composition wherein said method comprises packaging the composition into a mono-layer container comprising polypropylene resin and wherein the container has a wall thickness of between 0.25 mm and 0.6 mm. In a preferred embodiment, the composition comprises at least one resin of the group consisting of polyurethanes, polycarbonates, polyesters, and polyamides.

9 Claims, No Drawings

SINGLE LAYERED POLYPROPYLENE CONTAINERS AND THEIR USE

CROSS-REFERENCE TO RELATED APPLICATIONS

Not Applicable

FEDERALLY SPONSORED RESEARCH

Not Applicable

BACKGROUND OF THE INVENTION

1. Field of the Invention

The invention relates to packaging for hygroscopic resin materials, and more particularly the invention relates to methods for packaging a hygroscopic resin composition wherein said method comprises packaging the composition into a mono-layer container comprising polypropylene resin and wherein the container has a wall thickness of between 0.25 mm and 0.6 mm. In a preferred embodiment, the composition comprises at least one polyamide resin or a compatibilized blend of polyphenylene ether resin and polyamide resin.

2. Brief Description of the Related Art

Many engineering resins such as polyurethane resin, polycarbonate resins, polyester resins, and polyamide resins as well as various blends containing these resins are hygroscopic to varying degrees and absorb moisture from the air. In manufacturing processes for the resins special handling precautions are necessary to minimize the water absorption. Often the resins are produced as small pellets that are packaged for shipment to a molder or converter into articles of commerce. The pellets are typically dried by the molder to reduce the level of absorbed water to very low levels to avoid issues such as material degradation and surface appearance issues. Unfortunately, if water is allowed to absorb throughout the thickness of the pellets, extremely long drying times are required for the water to migrate out from the pellet. Consequently manufacturers of such resins take special precautions to both minimize the water level that is packaged with the pellets and utilize packaging that allows very little moisture permeation. Resins may remain packaged for many months before being used so moisture pickup by the resins while packaged is highly likely to occur, this is however highly undesirable. Moreover, the packaging cost needs to be minimized since most packaging is discarded after a single use.

Conventional manufacturing processes for such resins often involve use of a compounding extruder to mix the resin with any additional components. The material typically exits the extruder through a die in the form of numerous strands which are in turn cooled in a water bath and chopped into pellets for packaging. By controlling the degree of cooling in the water bath and allowing the strands to dry any residual moisture before chopping into pellets, manufacturers can control the level of moisture in the pellets up to the packaging stage. In order to maintain the level of water very low, special packaging must be used that has a very low water permeation level. Conventional packaging is often a multi-layer structure, for example, a two-layer structure of an aluminum foil adhered to a second layer, often made from polyethylene or polyvinyl chloride. Three layer structures for packaging are also used wherein the aluminum foil layer is sandwiched between two plastic resin layers. These conventional packagings have sufficient moisture barrier properties to maintain very low water levels in the packaged resin materials, however, these packages require special handling for loading and sealing, are very expensive, and are not recycleable and must be landfilled or burned after a single use. Methods have been developed to avoid the multi-layer packaging and utilize more conventional single layer packaging. For example, single layer polyethylene bags having a thickness of 0.2 mm have been used to package polyamide resins. The low melting point of the polyethylene requires that the pellets be cooled to a low temperature before packaging to avoid having the packaging distort or have pellets of the resin adhere to the packaging. Special manufacturing equipment and/or modifications to the aforementioned strand cooling and chopping procedures are necessary to meet the temperature limitation of the polyethylene package and maintain a low moisture level in the pellets. With such known packaging it cannot be avoided that the moisture content of the resin increases too much over time, making it necessary to dry the resin before molding it.

It is therefore apparent that there continues to be a need for improved methods for packaging hygroscopic resins.

SUMMARY OF THE INVENTION

The invention relates to packaging for hygroscopic resin materials, and more particularly the invention relates to methods for packaging a hygroscopic resin composition wherein said method comprises packaging the composition into a mono-layer container comprising polypropylene resin and wherein the container has a wall thickness of between 0.25 mm and 0.6 mm. In a preferred embodiment, the composition comprises at least one resin of the group consisting of polyurethanes, polycarbonates, polyesters, and polyamides. These and other embodiments of the invention will become apparent as described herein.

DESCRIPTION OF THE DRAWINGS

Not applicable

DETAILED DESCRIPTION OF THE INVENTION

According to this invention, there is provided a packaging structure of a monolayer comprising polypropylene resin wherein the mono-layer is between 0.25 mm and 0.60 mm, preferably between 0.28 mm and 0.40 mm. The package structure is free of a metal layer, such as an aluminum foil layer. The packaging structure may vary widely in size, such as from vary small packages of a few grams of material to fairly large, for example, as a liner in a bulk package of 500 kg or more. After filling the package with the desired amount of material, the package can be sealed by conventional methods such as, for example, heat sealing or sealing with an adhesive. The package can be manufactured by methods known in the packaging art.

Although most any resin material may be packaged in accordance with the present invention, it is most useful for packaging hygroscopic resin materials. Such hygroscopic resin materials include any resin that needs to have a moisture pick-up below about 0.15 weight percent water, preferably below about 0.10 weight percent water after being packaged for about 180 days. This invention is especially useful for packaging polyurethanes, polycarbonates, polyesters, and polyamides as well as various blends and alloys containing at least one of the aforementioned resins.

In a preferred embodiment of the invention, the resin material comprises at least one polyamide resin. The polyamide containing resin may be a conventional polyamide resin, for example, nylon-6, nylon-6,6, nylon-12 or may be a filled polyamide containing, for example, glass fibers and/or mineral fillers. Alternatively, the polyamide resin may be a compatibilized blend of at least one polyamide and at least one second resin material such as, for example, an elastomer or a polyphenylene ether resin. In an especially preferred embodiment, the resin composition comprises a compatibilized blend of a polyphenylene ether resin and a polyamide resin.

Compatibilized blends of a polyphenylene ether resin and a polyamide resin are generally known in the art. These blends are typically made through reactive compounding techniques involving addition of a compatibilizing agent to compositions containing polyphenylene ether resin and polyamide resin. The compatibilizing agent is thought to result in reaction products between the polyphenylene ether resin and a polyamide resin and that these reaction products improve the compatibility between the polyphenylene ether resin and polyamide resin. The improved compatibility results in enhanced physical properties such as, for example, increased ductility. Illustrative compatibilizing agents for blends of polyphenylene ether resin and polyamide resin include citric acid, maleic anhydride, fumaric acid, malic acid as well as various derivatives of the foregoing.

The ratio of polyphenylene ether resin to polyamide resin can vary widely but is preferably adjusted so that the polyamide resin remains the continuous phase. Preferably the polyamide is at least about 40% by weight of the total resin composition. Increasing the level of the polyamide results in enhanced ductility and flow and is often preferred. The resin compositions may contain more than one type of polyamide resin such as a blend of nylon 6 and nylon 6,6. When a mixture of nylon 6 and nylon 6,6 is used, it is often preferred to have a limited amount of nylon 6 in order to maximize the heat resistance of the compatibilized blend of a polyphenylene ether resin and polyamide resins. Minor amounts of nylon 6 are often useful at improving certain physical properties, for example, ductility. Moreover, the amine to acid endgroup ratio of the polyamide resin or mixture of polyamide resins may also be varied as well as the relative viscosity of the polyamide contained within the resin composition. Such variations are useful for fine-tuning certain physical properties desired in the final composition.

The polyphenylene ether resins useful in the present invention include all known polyphenylene ether resins. Preferable resins include poly(2,6-dimethylphenyl ether) as well as the copolymer resins of 2,6-dimethylphenol and 2,3,6-trimethylphenol. These and other variations of the polyamide and the polyphenylene ether resins do not detract from the present invention. In compositions wherein high heat resistance is desired to accommodate, for example, paint cure ovens, polyphenylene ether resins having a glass transition temperature (i.e. Tg) higher than the oven temperature are desirable as is use of a polyamide resin having a melting point (i.e. Tm) greater than the oven temperature. In a preferred embodiment, the polyphenylene ether resin comprises copolymer resins of 2,6-dimethylphenol and 2,3,6-trimethylphenol and the polyamide comprises nylon 6,6. Other variations in the resins are also useful based upon similar principles.

The compatibilized blend of polyphenylene ether resin and polyamide resin may additionally contain various property modifiers such as elastomers for ductility enhancement. Useful elastomers for this purpose are known in the art and include, for example, styrenic block copolymers and various acid functionalized ethylene-propylene copolymers (e.g., EF-graft-maleic anhydride). Other property modifiers include nucleating agents, stabilizers, flame retardants, pigments, dyes, mineral fillers and reinforcing agents.

One advantage of the present invention is that conventional manufacturing processes wherein the resin material to be packaged can exit a compounding extruder through a die in the form of numerous strands, cooled in a water bath, and chopped into pellets for packaging can be readily utilized. The pellet temperature can be maintained between about 500 and about 110°, preferably between about 50° C. and about 80° C. without significant distortion of the package or adherence of the pellets to the package.

It should be clear that the present invention includes a container for packaging a composition comprising at least one hygroscopic resin wherein said composition has a temperature of at least about 60° C. when packaged and wherein the container comprises a mono-layer of polypropylene resin free of a metal layer and wherein the container has a wall thickness of between 0.25 mm and 0.60 mm. It should be clear that the present invention includes a method for packaging a composition comprising at least one hygroscopic resin wherein said composition has a temperature of at least about 60° C. when packaged and wherein the packaging container comprises a mono-layer of polypropylene resin free of a metal layer and wherein the container has a wall thickness of between 0.25 mm and 0.60 mm.

The following illustrative examples demonstrate various embodiments of the present invention. However, they are not intended to limit the invention in any manner.

EXAMPLES

Example 1

A compatibilized resin blend of polyamide-6,6 and polyphenylene ether resin was prepared on a twin-screw extruder using methods known in the art. The resin blend was allowed to exit the extruder through a conventional die as strands of extrudate. The strands were passed through a water bath and allowed to exit the water bath and air cooled to remove residual moisture. The cooled strands were chopped into pellets having a size of about 4 mm by 3 mm. The pellets had a temperature between about 50° and about 70° C. Pellets were packaged into a bag made from polyethylene resin having a thickness of 0.2 mm. The bag distorted and some pellets adhered to the bag. The polyethylene bag was unacceptable at this pellet temperature. Pellets having a temperature between about 50° and about 70° C. were packaged into a bag made from polypropylene resin having a thickness of 0.14 mm; the polypropylene bag did not distort. Cooling the pellets to below about 50° C. was necessary to avoid distortion and adherence to the polyethylene bag.

Example 2

In order to test moisture pick-up of pellets packaged in various packaging structures, pellets of a conventional compatibilized resin blend of polyamide-6,6 and polyphenylene ether resin were packaged in thin wall bags and tested for weight percent water over time at atmospheric conditions with a relative humidity of about 50–70%.

| Days | PE/Al[1] | PE @ 0.2 mm | Paper/Al |
|---|---|---|---|
| 0 | 0.04 | 0.09 | 0.07 |
| 21 | 0.08 | 0.09 | 0.06 |
| 63 | 0.10 | 0.20 | 0.06 |
| 97 | 0.08 | 0.12 | 0.07 |
| 139 | 0.10 | 0.26 | 0.07 |

[1] PE/Al is a two-layer package of polyethylene lined with aluminum foil

As can be seen from the above data, the packaging structures containing a metal layer have very good barrier properties and result in very low moisture pick-up levels, even after 139 days. Polyethylene packaging as conventionally available is not suitable for long time storage due to the high moisture levels.

Example 3

In order to compare moisture pick-up of pellets packaged in bags made of a thin PE/Al laminate versus bags made out of a mono-layer of polypropylene packaging structures without metal layer, pellets of a conventional compatibilized resin blend of polyamide-6,6 and polyphenylene ether resin were packaged and tested for weight percent water over time. The filled bags were stored under atmospheric conditions with a relative humidity of about 50–70%. The thickness of the polypropylene layer was 0.3 mm±0.01 mm.

| Weeks | PE/Al | PP |
|---|---|---|
| 4 | 0.14 | 0.14 |
| 8 | 0.12 | 0.11 |
| 12 | 0.12 | 0.12 |
| 16 | 0.12 | 0.12 |
| 20 | 0.12 | 0.12 |

As can be readily seen by these data, the mono-layer polypropylene package unexpectedly performed as well, within experimental error, as the polyethylene/aluminum two-layer package conventionally used. A package outside the scope of the present invention and having a wall thickness of 0.2 mm polypropylene will have an unacceptable high water absorption. It was unexpected that such low moisture levels could be obtained with the method and container as claimed herein.

It should be clear from these data that this invention includes a method to package a hygroscopic material wherein the moisture pick-up of the material is less than about 0.15 weight percent water after 20 weeks.

What is claimed:

1. A method for packaging a hygroscopic engineering resin composition wherein the method comprises planing the engineering resin in a container effective to limit moisture pickup by the engineering plastic resin to less than 0.15 weight percent after twenty weeks, and sealing the container, wherein the container comprises a mono-layer of polypropylene resin, wherein the mono-layer has a thickness between 0.25 mm and 0.60 mm, and wherein the engineering resin is selected from the group consisting of polyurethanes, polycarbonates, polyesters and polyamides and blends containing at least one of these resins, and the engineering resin has a temperature between about 50° C. and about 100° C. during the placing.

2. The method of claim 1 wherein the hygroscopic composition comprises at least one polyamide resin or a blend containing at least one polyamide resin.

3. The method of claim 1 wherein the hygroscopic composition comprises a compatibilized blend of at least one polyamide resin and at least one polyphenylene ether resin.

4. The method of claim 1 wherein the method comprises packaging the hygroscopic composition at a temperature between about 50° C. and about 80° C.

5. The method of claim 1 wherein the mono-layer has a thickness between 0.28 mm and 0.40 mm.

6. A method for packaging pellets of a hygroscopic composition wherein the method includes placing the pellets into a container and sealing the container, wherein the pellets have a temperature between about 50° C. and about 110° C. during the placing and wherein the container comprises a mono-layer of polypropylene resin free of a metal layer having a thickness between 0.25 mm and 0.60 mm and is effective to limit moisture pickup by the pellets to less than 0.15 weight percent after twenty weeks.

7. The method of claim 6 wherein the hygroscopic composition comprises at least one resin of the group consisting of polyurethanes, polycarbonates, polyesters, and polyamides.

8. The method of claim 6 wherein the mono-layer has a thickness between 0.28 mm and 0.40 mm.

9. A method of claim 1, wherein the hygroscopic composition has a moisture pick-up of about 0.12 weight percent water or less after 20 weeks.

* * * * *

UNITED STATES PATENT AND TRADEMARK OFFICE
CERTIFICATE OF CORRECTION

PATENT NO. : 6,558,764 B2
DATED : May 6, 2003
INVENTOR(S) : Bas Blom et al.

It is certified that error appears in the above-identified patent and that said Letters Patent is hereby corrected as shown below:

Column 2,
Line 5, begin new paragraph with "Methods".

Column 4,
Line 4, delete "One advantage of the present invention is that conventional manufacturing processes wherein the resin material to be packaged can exit a compounding extruder through a die in the form of numerous strands, cooled in a water bath, and chopped into pellets for packaging can be readily utilized. The pellet temperature can be maintained between about 500 and about 110º, preferably between about 50º C. and about 80º C. without significant distortion of the package or adherence of the pellets to the package." and insert -- One advantage of the present invention is that conventional manufacturing processes can be used to cool the resin material after the resin material is extruded. For example, the resin material to be packaged can exit a compounding extruder through a die in the form of numerous strands, cooled in a water bath, and chopped into pellets for packaging and can be readily utilized. In a preferred embodiment of the present disclosure, the pellet temperature is cooled to between about 50ºC and about 110ºC, more preferably between about 50ºC and about 80ºC and then packaged into the monolayer polypropylene package without significant distortion of the package or adherence of the pellets to the package. --.

Column 6,
Line 5, after "comprises" delete "planing" and insert -- placing --.
Line 16, after "about" delete "100" and insert -- 110 --.

Signed and Sealed this

Fourteenth Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,558,764 B2
APPLICATION NO. : 09/263446
DATED : May 6, 2003
INVENTOR(S) : Bas Blom et al.

It is certified that error appears in the above-identified patent and that said Letters Patent is hereby corrected as shown below:

Title Page,
Item (73) Assignee, after "Company," delete "Pittsfield, MA" and insert therefor -- Schenectady, NY --.

Signed and Sealed this

Fifteenth Day of January, 2008

JON W. DUDAS
*Director of the United States Patent and Trademark Office*